United States Patent [19]
Osuna-Diaz

[11] 4,279,582
[45] Jul. 21, 1981

[54] METHOD AND APPARATUS FOR INDIVIDUAL CONTROL OF INJECTION MOLD SHUT-OFF BUSHINGS

[75] Inventor: Jesus M. Osuna-Diaz, Rochester, Mich.

[73] Assignee: Incoe Corporation, Troy, Mich.

[21] Appl. No.: 26,607

[22] Filed: Apr. 2, 1979

[51] Int. Cl.³ .................. B29F 1/03; B29F 1/05
[52] U.S. Cl. ..................... 425/159; 264/328.8;
425/160; 425/166; 425/549; 425/566; 425/570
[58] Field of Search ................. 425/564–566,
425/DIG. 229, 159, 160, 549, 570, 573, 166;
264/328.8

[56] References Cited

U.S. PATENT DOCUMENTS

| 2,770,011 | 11/1956 | Kelly | 18/30 |
|---|---|---|---|
| 2,773,284 | 12/1956 | Kelly | 425/DIG. 229 X |
| 2,828,507 | 4/1958 | Strauss | 18/30 |
| 3,024,498 | 3/1962 | Bronnenkant | 425/DIG. 229 |
| 3,238,563 | 3/1966 | Barnett | 425/DIG. 229 X |
| 3,436,446 | 4/1969 | Angell, Jr. | 264/51 |
| 3,491,408 | 1/1970 | Natkins | 18/30 |
| 3,806,295 | 4/1974 | Gellert | 425/DIG. 229 X |
| 3,847,525 | 11/1974 | Bielfeldt | 425/245 |
| 3,909,169 | 9/1975 | Barrie | 425/130 |

FOREIGN PATENT DOCUMENTS

| 2615282 | 11/1976 | Fed. Rep. of Germany | 425/566 |
|---|---|---|---|
| 48-20025 | 6/1973 | Japan | 425/566 |
| 1506861 | 2/1967 | United Kingdom . | |

Primary Examiner—Thomas P. Pavelko
Attorney, Agent, or Firm—Harness, Dickey & Pierce

[57] ABSTRACT

A method and apparatus for multiple cavity injection molding which permits individual variation of gate opening time for mold shut-off bushings. The gate pins for the shut-off bushings are controlled by individual double-acting fluid motor, the bushings being fed by a common manifold. Gate opening is thus not dependent upon attainment of a predetermined injection pressure. Closure of the gate for each cavity will permit material to be fed faster to the other cavities. Novel means is provided for securing each gate pin to its actuating cylinder, which minimizes heat transfer to the motor, accommodates expansion of the material manifold and permits gate opening adjustment. The fluid motors are end-mounted on an actuating fluid manifold, allowing close juxtaposition. A cycle counter may be used to control inventory.

8 Claims, 5 Drawing Figures

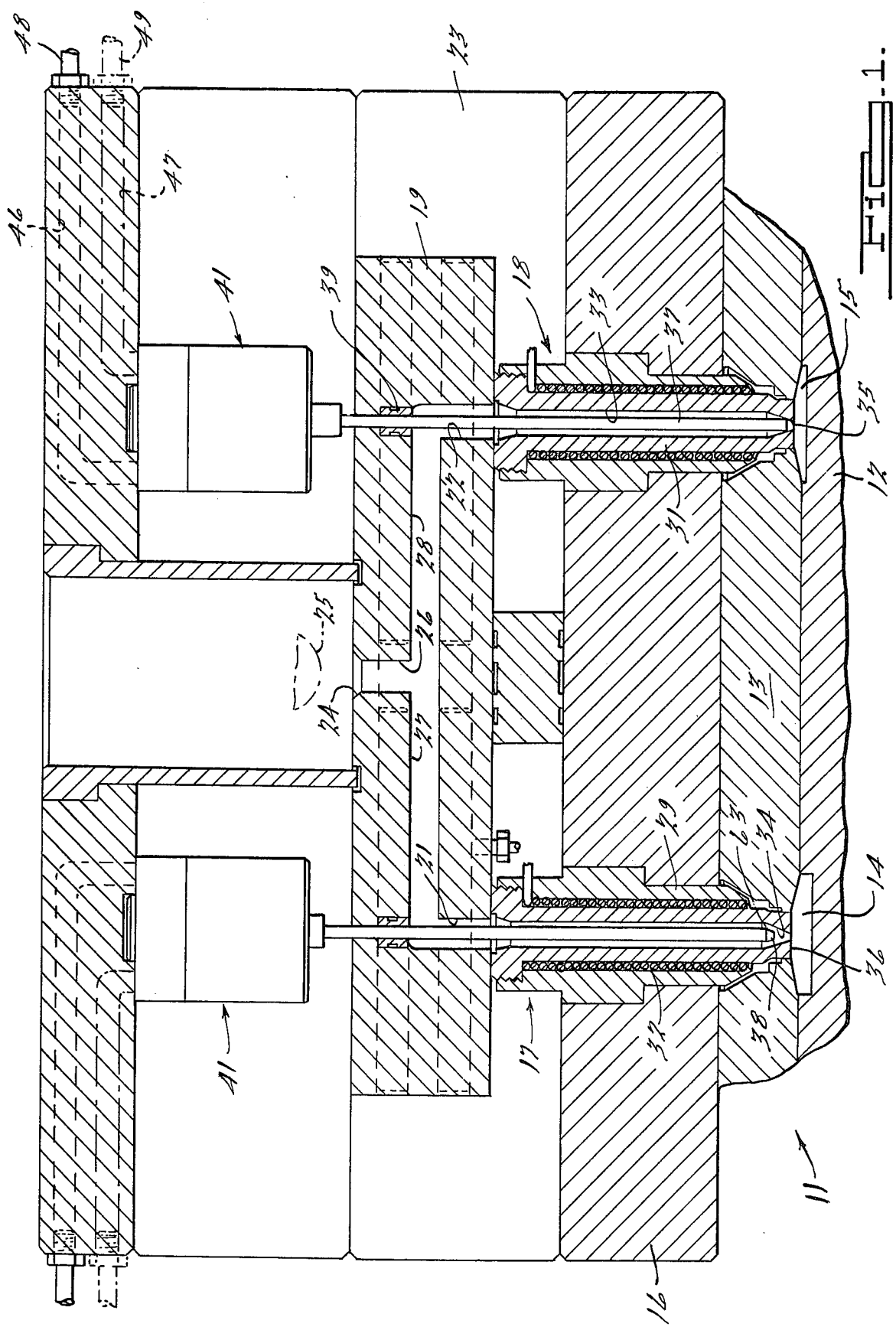

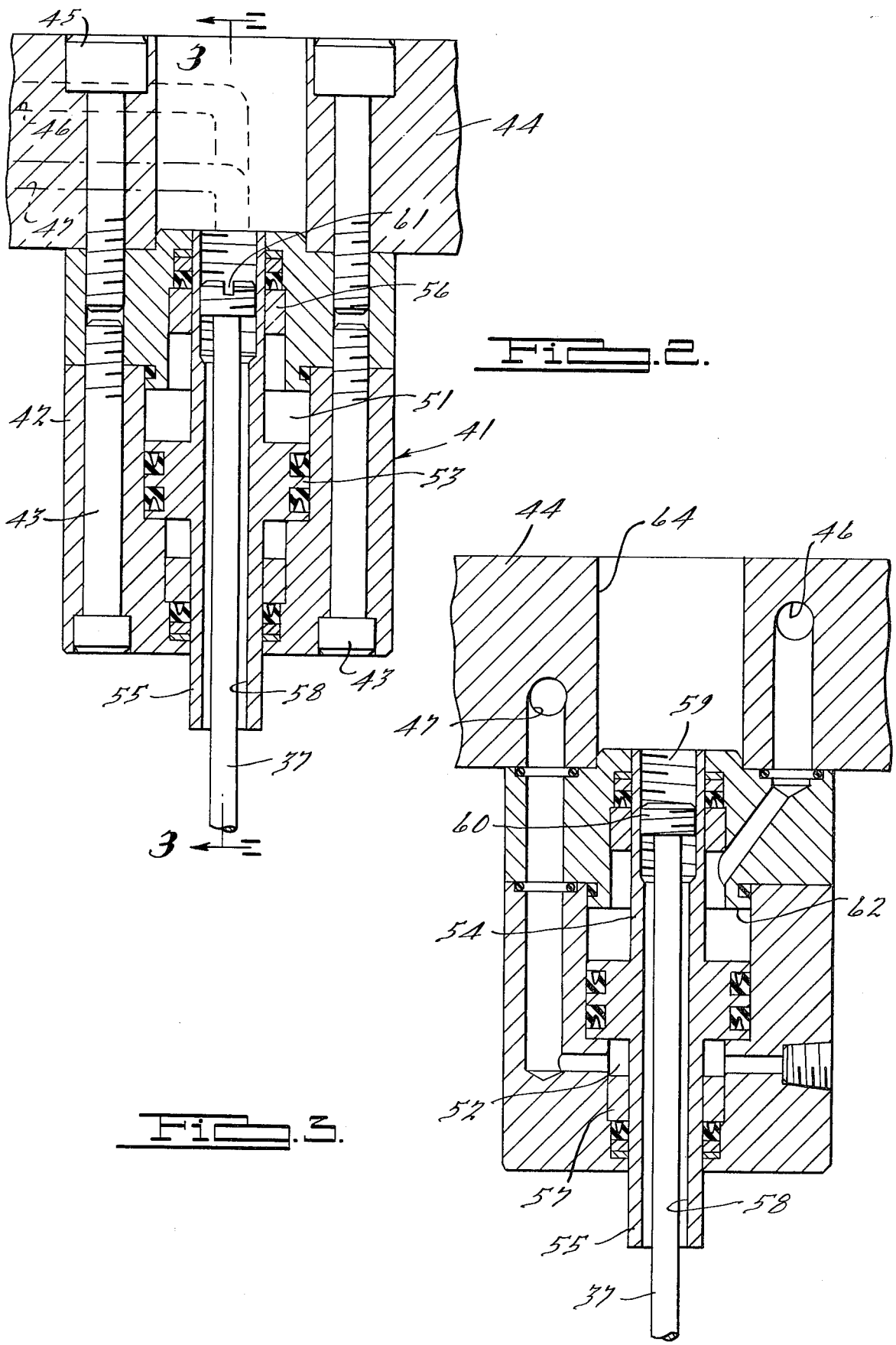

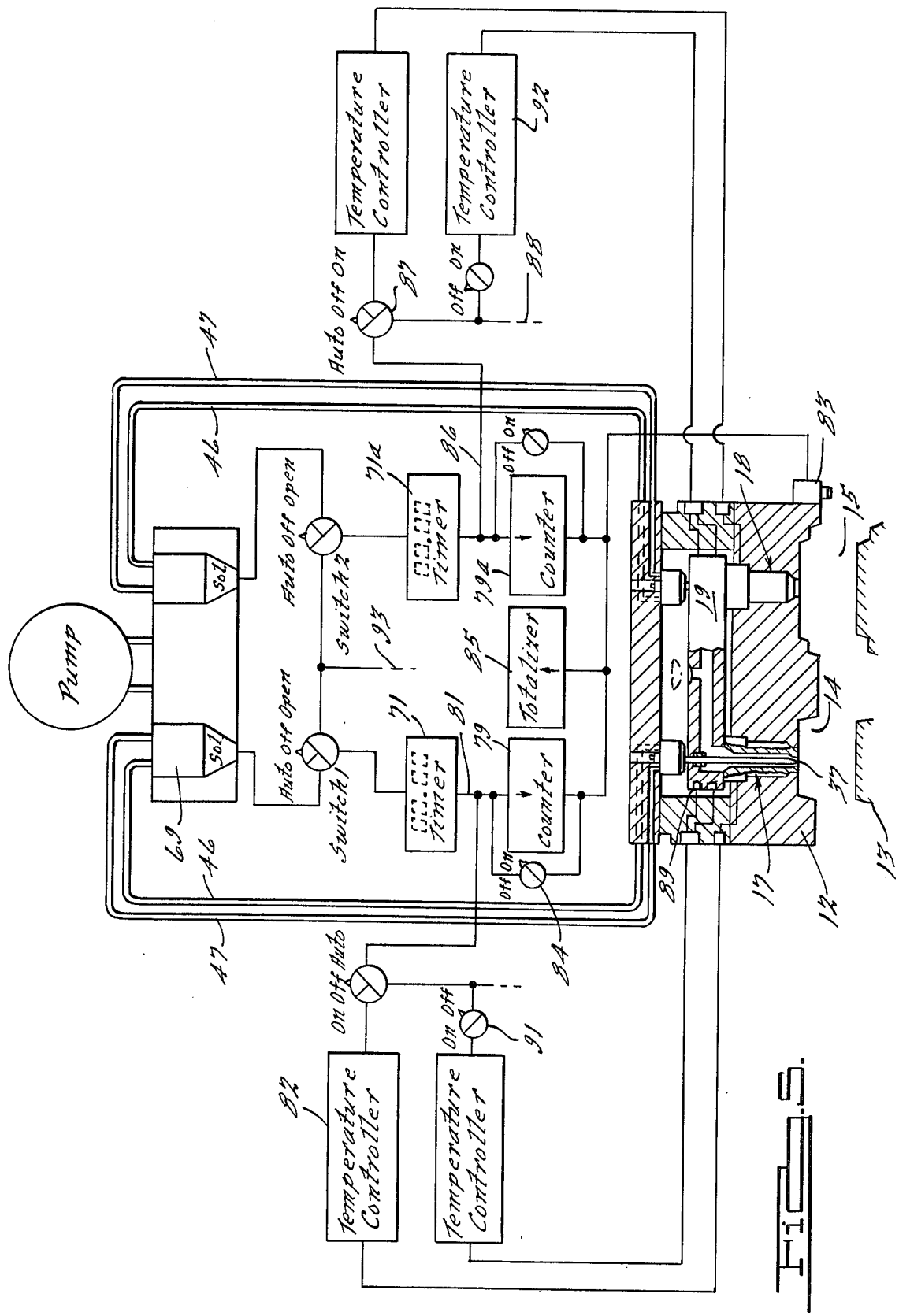

METHOD AND APPARATUS FOR INDIVIDUAL CONTROL OF INJECTION MOLD SHUT-OFF BUSHINGS

BACKGROUND OF THE INVENTION

1. Field of the Invention

This invention relates to injection molding procedures in which multiple cavities are simultaneously filled with plastic material. The invention is particularly concerned with situations where it is desired to mold a number of parts of dissimilar size in the same mold, or to use several nozzles for a single cavity, and also to adjust the mold gate opening at each shut-off bushing to create optimum flow conditions.

2. Description of the Prior Art

It is known to provide individual gate control on molding machines themselves, as contrasted with mold shut-off bushings. However, this means that the mold has to be constructed to fit the particular molding machine, greatly reducing the versatility of the construction and increasing manufacturing costs where a number of different molded parts are to be made.

Kelly U.S. Pat. No. 2,770,011 shows an injection molding machine in which a timer controls a fluid motor which operates retractable wedges so that gate pins for a plurality of mold cavities may be simultaneously retracted. However, there is no suggestion in Kelly of individual timing and control of gate pins nor of positive retraction thereof independently of material pressure. In Kelly, furthermore, the gate pins are not adjustable and the material outlets to the cavities are therefore of fixed size. The Kelly construction therefore does not permit individual variation of individual flow conditions to each cavity and it would not be feasible to use this construction for the simultaneous filling of cavities of dissimilar sizes.

Natkins U.S. Pat. No. 3,491,408 shows a distribution manifold carrying a number of spring-urged valve members which are retracted by material pressure, the extent of opening of the valve members being individually adjustable. Aside from the fact that this stop mechanism is shown on an injection molding machine rather than on the mold itself, it suffers from the drawback that injection pressure is used to activate the gates. This often causes material to "explode" into the cavity, inducing extra shear and creating additional heat that may affect the plastic.

Bielfeldt et al U.S. Pat. No. 3,847,525 shows an injection molding apparatus utilizing a distributing valve for sequential delivery to individual mold cavities, with rams controlled by double-acting pistons. This patent however has numerous drawbacks as compared with the present invention which will become apparent from the following description.

Barrie U.S. Pat. No. 3,909,169 and British Pat. No. 1,056,861 show injection molding systems having general pertinency to the present invention. Strauss U.S. Pat. No. 2,828,507 and Angell U.S. Pat. No. 3,436,446 show gate pins controlled by double acting fluid motors. These patents however are not believed to teach the present invention.

BRIEF SUMMARY OF THE INVENTION

It is an object of the present invention to provide an improved method and apparatus for injection molding machines which offers extreme flexibility in manufacturing, both as to individual flow control of multiple cavities which are being simultaneously filled, and also with respect to filling dissimilar sizes of cavities at the same time, or the same cavity with several nozzles.

It is a further object to provide an improved method and apparatus of this character which avoids the drawback of additional heat applied to the plastic because of high pressure when flowing into the mold, which might adversely affect the part.

It is another object to provide an improved method and apparatus of this nature which permits independent opening and closing of each cavity gate, thus opening each cavity only for the time it takes to reach optimum fill.

It is a further object to provide a novel apparatus and method having these characteristics, which greatly reduces cycle time because molds fill faster, thus eliminating holding time.

It is another object to provide an improved apparatus and method of this character which permits the use of a standard molding machine having a single entry with a large variety of multiple cavity molds while permitting the above described individual control, thus greatly reducing manufacturing costs to achieve this object.

It is also an object to provide an improved mounting construction for double acting fluid motors which is especially useful for controlling shut-off bushing gate pins and permits close juxtaposition of several motors without interference from actuating fluid hoses.

It is a further object to provide an improved fluid motor for a shut-off bushing mold pin which minimizes unwarranted heat transfer to the motor, accommodates lateral expansion of the material manifold and facilitates adjustment or replacement of the gate pin.

It is another object to provide an improved molding system of this type which can incorporate a cycle counter to stop the flow of material to any of multiple cavities for inventory control.

Briefly, the method of this invention includes the steps of providing a pair of multiple cavity mold dies one of which carries individual gate-controlled shut-off bushings for the mold cavities, holding all gates in their closed positions, closing the mold, simultaneously moving all gates to their open positions in response to mold closing, simultaneously feeding material to all the shut-off bushings from an individual source, individually moving each gate to a closed position whereby the material will be delivered to the remaining open gates after each gate is closed, and opening the mold after all cavities have been filled. The method may also include the steps of counting the number of times a gate is opened, and discontinuing opening of said gate in response to the attainment of a preselected number of openings while permitting the remaining gates to operate.

The apparatus of this invention briefly comprises a pair of mold dies forming multiple mold cavities movable between open and closed positions, a plurality of shut-off bushings carried by one of said mold dies, a material manifold having a single entry for connection to a molding machine and having passages leading to said shut-off bushings, a gate pin slidably mounted in each shut-off bushing, a double-acting fluid motor connected to each pin, means delivering pressurized fluid selectively to one or the other side of each motor to thereby advance each pin to its closed position or retract it to its open position, means responsive to closure of said mold dies to simultaneously move all said gates to their open position, means for individually adjusting the travel distance of each pin to its open position, means individually controlling each fluid actuated motor for actuating its pin to a closed position independently of the other pins whereby material from said single source will be delivered to the remaining open gates, and means opening said molds after all gates have been closed.

In another aspect, the invention comprises a plurality of double-acting fluid motors, each having a housing and advancing and retracting chambers, an actuating fluid manifold, means securing one end of each motor to a surface of said manifold, a pair of hoses connected to said manifold for each motor, advancing and retracting passages in said manifold leading from each pair of hoses to their respective motor, and fluid conduits in the housing of each motor leading from said passages to the advancing and retracting chambers of said motor.

BRIEF DESCRIPTION OF THE DRAWINGS

FIG. 1 is a cross-sectional view in elevation showing a multiple cavity mold incorporating the features of this invention, the view showing one gate pin in its open position and one in its closed position to illustrate the operation.

FIG. 2 is an enlarged fragmentary cross-sectional view showing the construction of a dual action fluid motor for a gate pin.

FIG. 3 is a view taken along the line 3—3 of FIG. 2 and showing the fluid passages for the motor.

FIG. 5 is a schematic diagram of a modified form of the invention in which cycle counters are provided for individual control of the cavities.

DESCRIPTION OF THE PREFERRED EMBODIMENT

Figure 4:
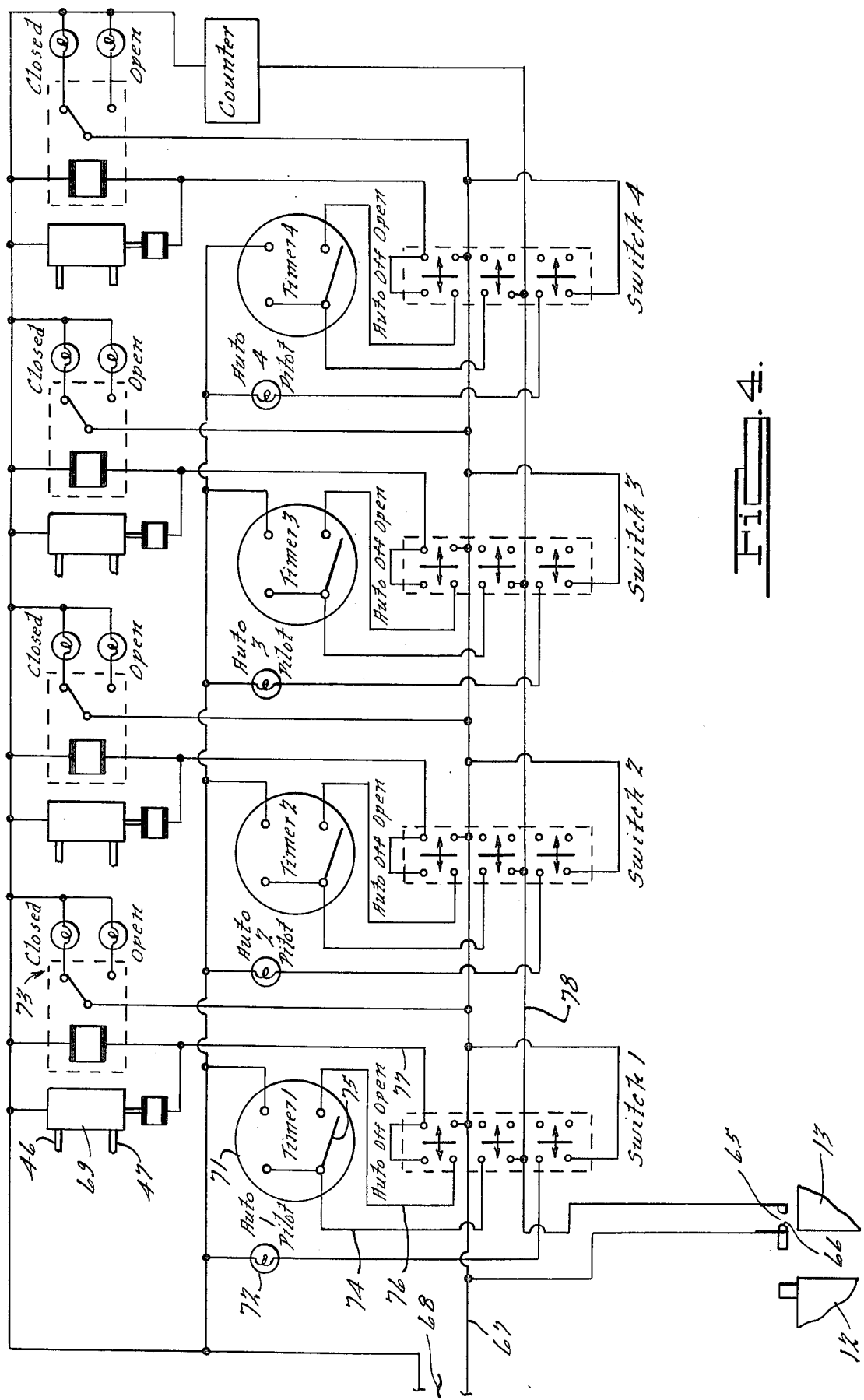
FIG. 4 is a circuit diagram showing the control means for the system.

A mold is generally indicated at 11 in FIG. 1, having a core part 12 and a cavity part 13. Mold 11 may have for example four mold cavities of which two are partially shown in FIG. 1 and indicated at 14 and 15. These parts may be dissimilar from each other if desired and have different volumes.

A cavity back-up plate 16 is provided for cavity mold half 13, and a pair of shut-off bushings generally indicated at 17 and 18 are mounted in plate 16 and mold half 13. The shut-off bushings open on cavities 14 and 15 respectively, a portion of the bushings remote from the cavities being disposed between plate 16 and a manifold 19 and aligned with manifold passages 21 and 22. Spacer means 23 is disposed between plate 16 and manifold 19. The manifold has a single entry 24 which receives a machine nozzle shown partially in dot-dash lines at 25. A passage 26 leading from entry 24 conducts material to branch passages 27 and 28 leading to passages 21 and 22 respectively.

Each bushing 17 and 18 comprises an outer housing 29 which surrounds the shank 31, a heater 32 being disposed between these two parts. A central material passage 33 extends through shank 31, the forward end 34 being tapered and leading to an outlet orifice 35. The forward surface 36 of shank 31 is flush with the cavity. Passage 33 is connected with passage 21 or 22 of the manifold.

A gate pin 37 is disposed within passage 33, the forward end 38 of this pin being tapered so that in its closed position, as seen with respect to bushing 18, the outlet is closed. Pin 37 extends through passage 21 or 22 and through a seal 39 in the manifold to a double-acting fluid motor generally indicated at 41 and shown in detail in FIGS. 2 and 3.

Each fluid motor 41 comprises a two-part housing 42 held together by bolts 43 and secured to the underside of an oil manifold 44 by bolts 45. The oil manifold has a plurality of passages 46 and 47 connected to hoses 48 and 49 respectively. Passage 46 leads to an advancing chamber 51 while passage 47 is connected to a retracting chamber 52 within the cylinder. A piston 53 is slidably mounted in the cylinder and has a double-ended piston rod 54,55. Piston rod portion 54 is slidable in a bearing 56 while portion 55 slides within a bearing 57.

A central passage 58 is formed in the piston and piston rod and is threaded at its rearward end 59. Gate pin 37 is disposed within passage 58 and its rearward end 60 is threadably mounted in portion 59 of the passage. Portion 60 is headed and has a slot 61 for screwdriver access. Pin 37 may thus be adjusted lengthwise by rotating head 60.

The rearward movement of piston 53 and therefore of pin 37 is limited by a shoulder 62 at the end of chamber 51. Depending on the adjustment of pin 37, the gap 63 (FIG. 1) which exists leading to orifice 35 when the pin is retracted may be controlled. Variation in this opening may be desired by individual molders or in accordance with other molding conditions. An access hole 64 is provided in manifold 44 so that pin 37 may be adjusted or removed for replacement, this access hole also providing clearance for piston rod portion 54.

Because of the fact that gate pin 37 is not in engagement with piston rod 55 except at its extreme rearward end, heat transfer from the molten material to motor 41 will be minimized. Moreover, the gap between the gate pin and piston rod will accommodate lateral shifting which could take place as a result of heat expansion of manifold 19 during operation. The construction and end mounting of motors 41 on manifold 44 means that all hoses 48 and 49 may be connected to the manifold rather than directly to the motors. This reduces crowding around the motors and permits them to be mounted close together if necessary.

FIG. 4 is a circuit diagram showing the means for individually controlling opening and closing of the shut-off pins. A limit switch 65 is provided which is closed in response to closing of the mold halves 12 and 13. One contact 66 of this switch is connected to one side 67 of a source of power 68. Four switches, numbered 1, 2, 3 and 4 are provided, these switches each having three positions, "auto", "off" and "open". When in their "auto" position the contacts of the four switches will be on the left hand side. Each switch is connected to a solenoid-operated valve 69 for controlling fluid flow to and from a particular bushing 17 or 18. The connection is through a timer 71. Indicator lights 72 for showing the automatic condition and further indicator lights indicated generally at 73 for showing the valve conditions are also illustrated but will not be described in detail.

In operation, assuming an initial condition in which switches 1 to 4 are in "auto" position and mold halves 12 and 13 are separated, limit switch 65 will be open. Closure of the mold halves will cause this switch to close, and power will flow through conduits 74 to timer 71, closing the timer switch 75. Current will flow through conduits 76 and 77 to the solenoid of valve 69, causing this valve to shift so as to retract its associated gate pin. Because conduit 78 leading from limit switch 65 is connected to all switches 1, 2, 3 and 4, all four timers will be actuated and thus all shut-off bushings will be opened. The degree of opening of each shut-off bushing will depend however on the previous adjustment of its gate pin as described above with respect to FIGS. 2 and 3.

The timers will all begin to run as material flows into all four cavities. It should be noted that the gate pins will not be retracted by the pressure of the material, but by the positive action of their individual fluid motors, so that material can flow into all cavities under relatively low injection pressure.

When the first cavity is filled with the optimum amount of material, as determined during setup either by its individual timer or by other means such as pressure-sensitive transducers (not shown), the corresponding solenoid-operated valve 69 will be shifted to its opposite position, thus advancing its fluid motor piston 53 and corresponding gate pin 37 to its closed position. From that point on, the material flowing into the single entry 24 will be able to fill the remaining open cavities. When all cavities have been properly filled as controlled in the manner described above, all gate pins will have been closed and the molds may then be opened.

FIG. 5 shows schematically a modified form of the invention in which a cycle counter 79 is provided for each gate pin 37, by connecting the counter at 81 to the timer 71 for such pin. By presetting this counter, it may be used to disenable its timer after a preselected number of gate pin openings has been attained. This gate pin will thereafter remain closed while the remaining gate pins operate. Thus inventory control for individual cavities of a multiple cavity mold may be achieved. At the same time, the counter may open the circuit to heater 32 for the corresponding shut-off bushing 17, by means of a temperature controller indicated at 82. This will prevent degradation of material in the inactive bushing.

More particularly, FIG. 5 shows mold halves 12 and 13 with a switch 83 which closes in response to mold closing. This switch is connected to counters 79 and 79a for bushings 17 and 18 respectively. These are countdown counters which may be preset for given figures and will disenable their respective timers when they reach zero. Switches 84 may be provided for the counters, which when moved to their "off" positions will bypass the counters. A totalizer 85 may also be provided to count the total mold cycles. Timers 71 and 71a control their respective solenoid-operated valves 69 through switches 1 and 2 as in the embodiment of FIG. 4. Counters 79 and 79a are also connected to bushing heater temperature controllers 82 by connections 86 and switches 87. These switches are individually movable to an "auto" position so that the counters can disenable the controllers, or to as "on" position in which the heaters are always energized from a power source 88. The power source also supplies heaters 89 for manifold 19 through a switch 91 and temperature controllers 92. The power source for solenoid-operated valves 69 is indicated at 93.

Operation of the embodiment of FIG. 5 will be similar to that of FIG. 4, with the exception that, with any counter 79 operative, it will count down the preset number of cycles and then disenable its timer. This will cause the corresponding gate pin to be closed, and its heater to be de-energized.

It will be noted that the invention permits the use of standard molding machines, the individual shut-off bushings in the mold being made to any desired length and spacing rather than being dictated by the requirements of a special machine. The invention is thus useful not only for multiple cavity molds but for molds with a single cavity where several bushings are needed to fill the cavity. An example could be cavity for an assymetrical part, where one portion of the cavity must be filled at a different rate, or requires a bushing of different length, than another portion.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. In combination, a pair of mold dies movable between open and closed positions, a plurality of shut-off bushings carried by one of said mold dies, a material manifold having a single entry for connection to a molding machine and having passages leading to said shut-off bushings, a gate pin slidably mounted in each shut-off bushing, means responsive to closure of said mold dies to simultaneously move all said gate pins to their open position, individual motor means for advancing each pin to a closed position independently of the other pins, whereby material from said single source will be delivered to the remaining open gates, and means opening said molds after all gates have been closed, said motor means each comprising a hollow piston rod, said gate pin extending through said piston rod and being secured thereto at its rearward end, the remainder of said gate pin within said piston rod being spaced inwardly therefrom to provide a heat insulating gap which also accommodates relative lateral shifting between the gate pin and piston rod.

2. In a mold die assembly of the type having a pair of mold dies movable between open and closed positions, a plurality of shut-off bushings carried by one of said mold dies, a material manifold having a single entry for connection to a molding machine and having passages leading to said shut-off bushings, a gate pin slidably mounted in each shut-off bushing, means responsive to closure of said mold dies to individually move all said gate pins to their open position, individual motor means for advancing each pin to a closed position independently of the other pins whereby material from said single source will be delivered to any remaining open gates, and means opening said molds after all gates have been closed, the improvement wherein said motor means each has a hollow piston rod, each gate pin extends through its respective piston rod and is secured thereto at its rearward end, and the remainder of said gate pins within said piston rods is spaced inwardly therefrom to provide heat insulating gaps which also accommodate relative lateral shifting between the gate pins and the piston rods.

3. In a plastic injection molding machine of the type having a pair of mold dies provided with cavity means and movable between open and closed positions, a plurality of shut-off bushings carried by said mold dies each having a gate through which melt material is discharged into said cavity means, a material manifold having a single entry for receiving melt from said machine and passages leading from said single entry through which melt material is delivered to said shut-off bushings, gate pins slidably mounted in said shut-off bushings movable to open or close said gates to control flow of melt material into said cavity means, actuator means for moving said gate pins in predetermined sequence to selectively open or close said gates whereby, upon closure of one or more of said gate pins, melt material is delivered to any remaining open gates, and means for opening said molds after all of said gates have been closed, the improvement wherein said pin actuator means comprises fluid motors having hollow piston rods; wherein said gate pins extend through said piston rods and are secured thereto at the rearward ends thereof; and wherein the portions of said pins ahead of their points of attachment to said piston rods are spaced inwardly from the latter to provide heat insulating gaps which also accommodate relative lateral shifting between said gate pins and said piston rods.

4. In a mold die assembly adapted for use with a plastic injection molding machine and of a type having cavity means therein and a plurality of gates communicating with said cavity means, means for delivering melt material simultaneously to said gates for injection into said cavity means, gate pins for selectively opening and closing said gates, and fluid motors having piston means forming gate pin actuators, the improvement comprising connecting means fastening rearward end portions of said gate pins to respective gate pin actuators, and means ahead of said connecting means providing radial clearances between the said piston means and adjacent portions of said gate pins, said clearances forming heat insulating gaps and also accommodating relative lateral shifting between said gate pins and said piston means.

5. In a mold die assembly adapted for use with a plastic injection molding machine and of a type having cavity means therein and a plurality of gates communicating with said cavity means, means for delivering melt material simultaneously to said gates for injection into said cavity means, gate pins for selectively opening and closing said gates, and fluid motors having piston means forming gate pin actuators, the improvement comprising means forming access openings in said fluid motors rearwardly of and in-line with said gate pins, and connecting means detachably fastening rearward end portions of said gate pins to respective gate pin actuators operable to permit adjustment of said gate pins longitudinally relative to said actuators and to permit removal of said gate pins rearwardly through the access openings of said fluid motors.

6. The invention as defined by claim 5 including an oil manifold connected to and carrying said fluid motors, said manifold having access openings in-line with said gate pins and with the access openings of said fluid motors, whereby said gate pins are removable not only through the access openings of said fluid motors but also through the access openings of said oil manifold.

7. The invention as defined by claim 5 including means ahead of said connecting means providing radial clearances between the said piston means and adjacent portions of said gate pins, said clearances forming heat insulating gaps and also accommodating relative lateral shifting between said gate pins and said piston means.

8. In a multi-cavity mold die assembly adapted for use with a plastic injection molding machine having a machine nozzle and wherein the mold die has a plurality of fluid-motor actuated gate pins, said fluid motors including advanceable and retractable pistons connected to said gate pins and forming gate pin actuators, and means connecting each of said gate pins to a respective one of said gate pin actuators operable to adjust said gate pins longitudinally relative to said actuators, the improvement wherein said fluid motors have access openings in-line with said gate pins, and including an oil manifold connected to and carrying said fluid motors, said manifold having access openings in-line with said gate pins and the access openings of said fluid motors, said means for adjustably connecting said gate pins to said gate pin actuators permitting removal of said gate pins rearwardly through the access openings of said fluid motors and of said oil manifold.

* * * * *